Figure 5:
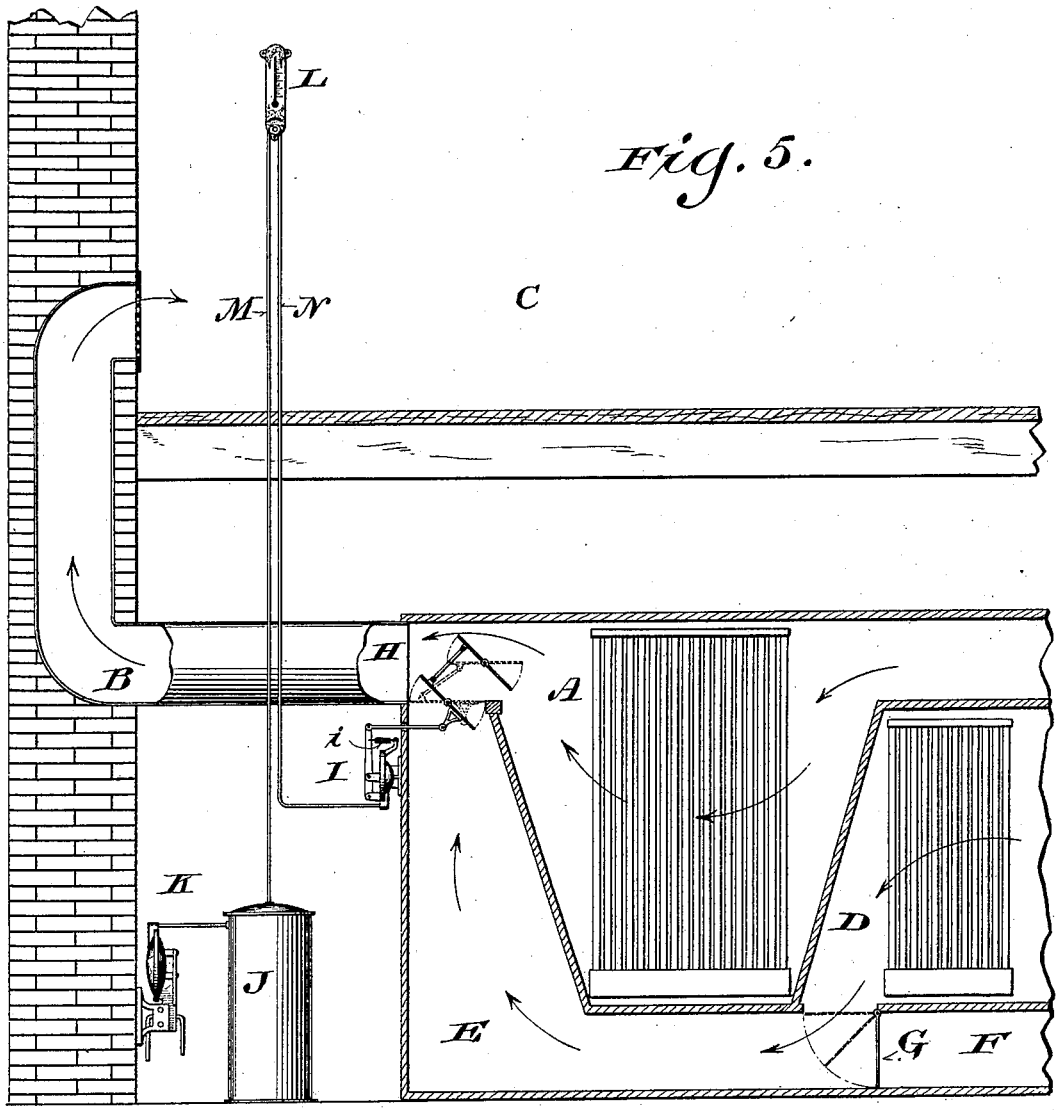

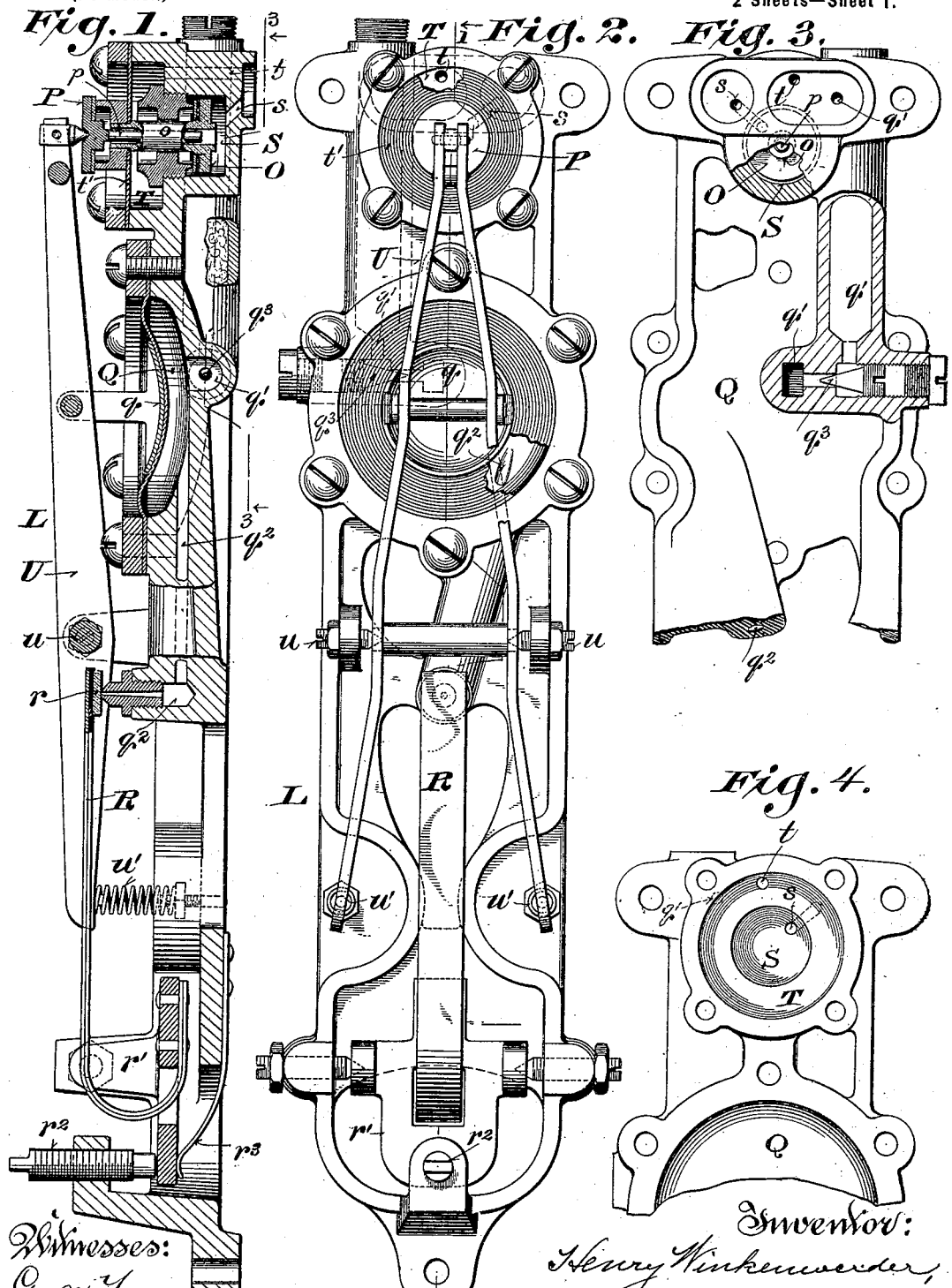

UNITED STATES PATENT OFFICE.

HENRY WINKENWERDER, OF MILWAUKEE, WISCONSIN, ASSIGNOR TO JOHNSON ELECTRIC SERVICE COMPANY, OF SAME PLACE.

TEMPERATURE-REGULATING APPARATUS.

SPECIFICATION forming part of Letters Patent No. 680,423, dated August 13, 1901.

Application filed August 13, 1898. Serial No. 688,529. (No model.)

*To all whom it may concern:*

Be it known that I, HENRY WINKENWERDER, a citizen of the United States, residing at Milwaukee, in the county of Milwaukee and State of Wisconsin, have invented certain new and useful Improvements in Temperature-Regulating Apparatus, of which the following is a specification, reference being had to the accompanying drawings, forming a part thereof.

My invention relates particularly to apparatus for heating and ventilating through the medium of air.

The main object of the invention is to gradually or step by step open or close, either partially or completely, a damper or valve controlling the admission of heated, tempered, or cool air to a room.

It consists in certain novel constructions, arrangements, and combinations of parts hereinafter particularly described, and pointed out in the claims.

In the accompanying drawings like letters designate the same parts in the several figures.

Figure 1 is an enlarged section on the line 1 1, Fig. 2, of thermostatic supply and waste valve mechanism embodying my invention. Fig. 2 is a front elevation of the same. Fig. 3 is a reverse view of the upper part of the mechanism shown in Figs. 1 and 2, partly in elevation and partly in section, indicated by the dotted line 3 3, Fig. 1. Fig. 4 is a front view of the thermostatic-valve base and chamber; and Fig. 5 is a diagram, partly in vertical section and partly in elevation, of so much of a heating and heat-regulating system as is necessary to a full understanding of the thermostatic-valve mechanism embodying my invention.

Referring to Fig. 5, A designates an incased heating-coil for supplying heated air through a duct B to an apartment C, the temperature of which is to be regulated by my improved apparatus. D is an auxiliary heating-coil for tempering cold air which is delivered to a duct E, leading into the duct B. F is a duct for supplying air at the outside temperature to the duct E, and G is a valve or damper for controlling the relative opening of the chamber containing the coil D and of the cold-air duct F into the tempered-air duct E. This valve or damper is usually operated automatically under the control of a thermostat placed in the tempered-air duct E, so that whatever the condition of the weather may be the tempered air in said duct E will be maintained at a constant temperature—about that of the room to be supplied with heat and ventilated through the common duct B. H is a double damper, arranged to control the relative opening from the chamber containing the main heating-coil A and from the tempered-air duct E into the duct B. I do not wish, however, to be understood as limiting the application of my invention to this particular kind of heating apparatus or form of damper or main valve, as they are shown merely to explain my improvements, which may be applied to various other kinds and arrangements of heating and ventilating apparatus. I is a fluid-pressure motor of any suitable kind for operating the damper or valve. J is a reservoir for holding compressed air or any other suitable fluid medium for operating said motor. K represents a compressor for supplying said reservoir with air or other fluid at the requisite pressure. L designates the thermostatic-valve mechanism for controlling the supply of the fluid-pressure medium to the motor I. It is connected by a supply-pipe M with the reservoir J and by a service-pipe N with the expansion-chamber of the motor I.

Referring to Figs. 1 to 4, inclusive, the thermostatic-valve mechanism above mentioned comprises supply and waste valves O and P, a second fluid-pressure motor Q for imparting the initial movement to said valves, and a thermostatic expansion strip or bar R for controlling the operation of the second motor according to variations in the temperature of the room or apartment in which the thermostat is located. These several parts may be conveniently associated together in a single instrument and mounted upon the same base. In this base, the upper part of which constitutes a valve-case, is formed a service-chamber S and a supply-chamber T, the former communicating through a port *s* with the service-pipe N and the latter through a port or passage *t* with the supply-pipe M. The supply-valve O is formed or provided with a hollow stem *o*, which passes loosely through a gland or sleeve between said chambers S and T and is attached at its outer end to a flexible diaphragm $t'$, which forms the upper or outer side of the supply-chamber T and serves the purpose of a stuffing-box, permitting the required movement of said valve. The passage in said hollow stem $o$ leads from the service-chamber S, through said diaphragm to the atmosphere, and the valve O, contained in the service-chamber S, normally closes the port at the inner end of said gland or sleeve. The outer end of the stem $o$ is formed or provided outside of the diaphragm $t'$ with an extension which has a recess or cavity communicating through the passage in said stem with the service-chamber S and constitutes the seat of the waste-valve P. The waste-valve P is formed or provided with a stem $p$, which is loosely guided in the hollow stem $o$ of the supply-valve O. The gland or sleeve between the valve-chambers is formed in its inner end with a recess or cavity corresponding with that in the extension at the outer end of the valve-stem $o$, and this recess or cavity communicates through the space between said sleeve or gland and the valve-stem $o$ with the supply-chamber T.

U is a lever fulcrumed to the base of the instrument at $u$ and having at one end a connection with or a bearing against the waste-valve P. It is connected at an intermediate point between said waste-valve and its fulcrum with the movable part $q$ of the motor Q. The expansion-chamber of said motor has an inlet or supply port or passage $q'$ in communication with the supply-pipe M and an outlet or waste port or passage $q^2$. The supply port or passage $q'$ is restricted and adjusted to a smaller area than that of the waste port or passage $q^2$ by a pin-valve $q^3$, as shown in Fig. 3. The outlet or waste port or passage $q^2$ is normally closed or controlled by a pad or valve $r$, carried by the thermostatic expansion-strip R. This expansion-strip is constructed in the usual way of two metals or substances having different coefficients of expansion, so that a rise in temperature will tend to bend it in one direction and a fall in temperature in the reverse direction. It is attached to a plate or frame $r'$, pivoted to the base of the instrument, as shown in Figs. 1 and 2, and a screw $r^2$, bearing against said plate or frame in opposition to a spring $r^3$, serves to adjust said expansion-strip so that it will open or close the waste-port of the motor Q at the desired degree of temperature. The lever U is extended beyond or below its fulcrum, and between the end thereof and the base of the instrument are interposed springs $u'$, which, acting in opposition to the fluid-pressure in motor Q, tend, first, to close the waste-valve P, and, second, to open the supply-valve O. I do not wish, however, to be understood as limiting myself to the kind of thermostat or to the connections by which it effects the operation of the supply and waste valve mechanism, since any known kind of thermostat may be employed to effect the initial movement of the supply and waste valves either directly or indirectly through the medium of some other force controlled by it. If the thermostat is made of sufficient strength it may be applied directly to the valve mechanism without the intervention of an intermediate motor or auxiliary power. In short, the various details of construction and arrangement of parts may be modified in various ways within the spirit and intended scope of my invention.

The apparatus, as hereinbefore described, operates as follows: Assuming that the double damper is in an intermediate position, as shown by full lines in Fig. 5, so as to partially open communication between the duct B and both the hot-air chamber containing the main heating-coil A and the tempered-air duct E and that the thermostatic-valve mechanism is in the position shown in Fig. 1, in which both the supply-valve O and the waste-valve P are closed, if the temperature of the apartment in which the thermostatic instrument L is located rises above the degree which the instrument is adjusted to maintain the expansion-strip R will be bent away from the waste-port of the motor Q, slightly increasing the area of opening therein and allowing the air to escape from the expansion-chamber of said motor a little faster than it can enter through the restricted supply port or passage $q'$. The fluid-pressure in said motor being thus reduced allows the springs $u'$ to react on the movable part $q$ and, aided by the full supply-pressure on the outer side of the supply-valve O, to force said valve slightly away from its seat against the service-pressure in chamber S. The service-pressure in chamber S, the expansion-chamber of the main motor I, and the service-pipe N is thus augmented and reacts upon the inner side of the supply-valve O. When this augmented service-pressure plus the remaining pressure in motor Q equals or slightly exceeds the supply-pressure on the outer side of said valve plus the pressure exerted by the springs $u'$, the supply-valve O will be closed and the increased service-pressure will be maintained in the main motor I until there is a further change in the temperature of the apartment in which the thermostat is located. The augmented pressure thus produced in the main motor acting in opposition to the spring $i$, which tends to close the cool or tempered air duct and to open the heated-air supply opening, turns the double damper an interval in the opposite direction, reducing the area of the opening from the hot-air chamber and increasing the opening from the tempered-air duct E into the common duct B, leading to the room C. The damper will remain in the position in which it is left by the foregoing operation until a further change of temperature takes place. If the temperature continues to rise, the expansion-strip R will be bent farther away from the waste-port of motor Q, thus further reducing the pressure in said motor and permitting the unbalanced force of the springs $u'$ to again slightly open the supply-valve O, whereby the pressure in the service-chamber S and its connections is further augmented and the double damper is moved another interval in the same direction. The augmented service-pressure, as before, reacts upon the supply-valve O in opposition to the supply-pressure and the springs $u'$ and closes said valve. Should the temperature of the room from any cause still continue to rise, the operation of the apparatus above explained would be repeated until the double damper H completely closed the hot-air-supply opening and opened the cool or tempered air opening into the duct B. If on the other hand the temperature of the room falls below the degree which the thermostat is adjusted to maintain, the expansion-strip R is bent toward the waste-port of motor Q, restricting its area and increasing the pressure in the expansion-chamber of said motor. This increased pressure acting upon the lever U relieves the waste-valve P of the tension of the springs $u'$, which tend to close it, thus allowing the service-pressure on the inner side of said valve to open it slightly against the atmospheric pressure on the outside. When this occurs, air is allowed to escape through the hollow stem $o$ of the supply-valve O from the service-chamber S and its connections, thereby reducing the pressure in the main motor I and allowing the spring $i$ to turn the double damper H an interval in the direction to open the hot-air opening and to close the cool or tempered air opening into the duct B. When the service pressure plus the increased pressure in motor Q is reduced to or slightly below the force exerted by the springs $u'$ plus the atmospheric pressure on the outside of the waste-valve P, said valve will be closed, the reduced pressure in motor I will be maintained, and the damper H will remain in the position to which it was last turned until there is a further fall or change in temperature affecting the thermostat. If the temperature continues to fall, the operation last explained will be repeated until the damper H is moved to its extreme position, (indicated by dotted lines in Fig. 5,) so as to completely open communication between the duct B and the hot-air chamber containing the coil A and completely close communication between said duct B and the cool or tempered air duct E. If, however, the temperature in the room C reaches the degree which the thermostat is adjusted to maintain before the damper H reaches its extreme position, said damper will be held in an intermediate position and will be moved therefrom in either direction only upon a further change in temperature, according to the nature of such change, a rise in temperature turning the damper in one direction and a fall in temperature turning it in the other direction from any given position.

It will be observed that in the construction of the supply and waste valve mechanism herein shown and described the supply-valve has a considerable effective area, which is exposed on one side to the substantially constant supply-pressure and on the opposite side to the variable service-pressure, and that the waste-valve has a corresponding area exposed on one side to the variable service-pressure and on the other side to the substantially constant atmospheric pressure, thus causing variations in said service-pressure produced by the initial movement of said valves and effected by thermostatic action to check, supplement, or modify such initial movement by the reaction of increased service-pressure upon the supply-valve O against the constant supply-pressure and by the reaction of the constant atmospheric pressure upon the waste-valve P against reduced service-pressure. Thus the differential pressure between the constant supply-pressure and the variable service-pressure on the one hand and the differential pressure between the constant atmospheric pressure and the variable service-pressure on the other hand serve, by reacting directly upon the supply and waste valves, to check, reverse, or modify their initial movement, which is thermostatically effected, and to produce a graduated movement of the heat-controlling damper or valve according to variations in the temperature to which the thermostat is subjected.

The thermostat may be applied to control the supply instead of the waste of the second motor Q without otherwise affecting the operation of the apparatus.

I claim—

1. In temperature-regulating apparatus the combination with a heat-controlling damper or valve, a fluid-pressure motor for operating the same and a source of fluid-pressure, of valve mechanism comprising a service-chamber in communication with said motor, a supply-chamber in communication with the source of fluid-pressure, a supply-valve controlling a port between said chambers and having a stem attached to a flexible diaphragm which forms one side of said supply-chamber, a passage in said stem leading from the service-chamber through said diaphragm to the atmosphere and being enlarged at its outer end, a waste-valve normally closing the enlarged end of said passage, and a thermostat arranged to effect the initial movement of said supply and waste valves according to changes of temperature in the room in which the thermostat is located, said supply and waste valves and their fluid connections being so constructed and arranged that such movement will be checked or modified by variations in the service-pressure controlled by said valves, substantially as and for the purposes set forth.

2. In temperature-regulating apparatus the combination with a heat-controlling damper or valve, a fluid-pressure motor for operating the same and a source of fluid-pressure, of valve mechanism controlling the supply and release of the fluid medium to and from said motor and comprising a service-chamber in communication with said motor, a supply-chamber in communication with the source of fluid-pressure, a supply-valve controlling a port between said chambers and having a hollow stem attached to a flexible diaphragm which forms one side of the supply-chamber, the passage in said stem leading from the service-chamber through said diaphragm to the atmosphere and having an enlarged port at its outer end, a waste-valve normally closing said port and having a stem guided in the hollow stem of the supply-valve, and a second fluid-pressure motor having supply and waste connections one of which is thermostatically controlled for effecting the initial movement of said supply and waste valves, substantially as and for the purposes set forth.

3. In temperature-regulating apparatus the combination with a heat-controlling damper or valve, a fluid-pressure motor for operating the same and a source of fluid-pressure, of valve mechanism comprising a service-chamber in communication with said motor, a supply-chamber in communication with the source of fluid-pressure, a supply-valve normally closing a port between said chambers and having a hollow stem the passage in which leads from said service-chamber to the atmosphere, and a waste-valve normally closing said passage, a second fluid-pressure motor having inlet and outlet ports one of which is thermostatically controlled, a lever connected with said second motor and with the waste-valve and a spring acting on said lever in opposition to the fluid-pressure in said second motor, said spring tending to close the waste-valve and to open the supply-valve, substantially as and for the purposes set forth.

In witness whereof I hereto affix my signature in presence of two witnesses.

HENRY WINKENWERDER.

Witnesses:
   CHAS. L. GOSS,
   ALFRED MORAWETZ.